July 2, 1935.  E. J. W. RAGSDALE  2,006,479
VEHICLE BRAKE
Original Filed Jan. 8, 1931   2 Sheets-Sheet 1
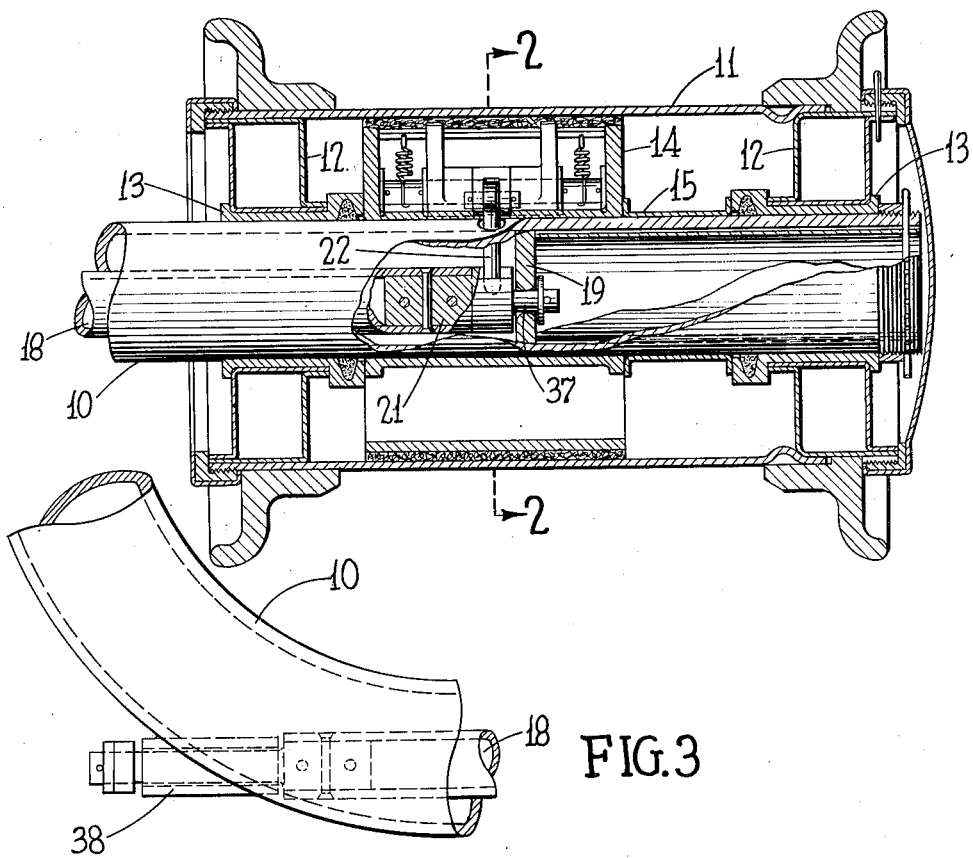
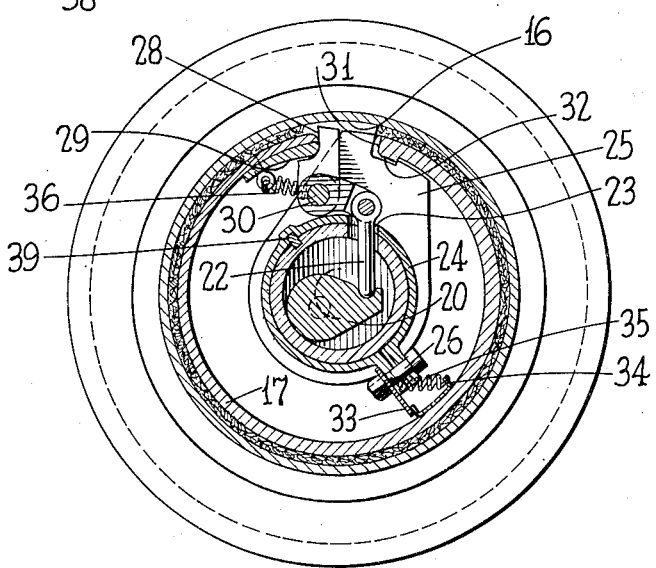
INVENTOR
EARL J. W. RAGSDALE
BY John P. Tarbox
ATTORNEY.

July 2, 1935.  E. J. W. RAGSDALE  2,006,479
VEHICLE BRAKE
Original Filed Jan. 8, 1931  2 Sheets-Sheet 2
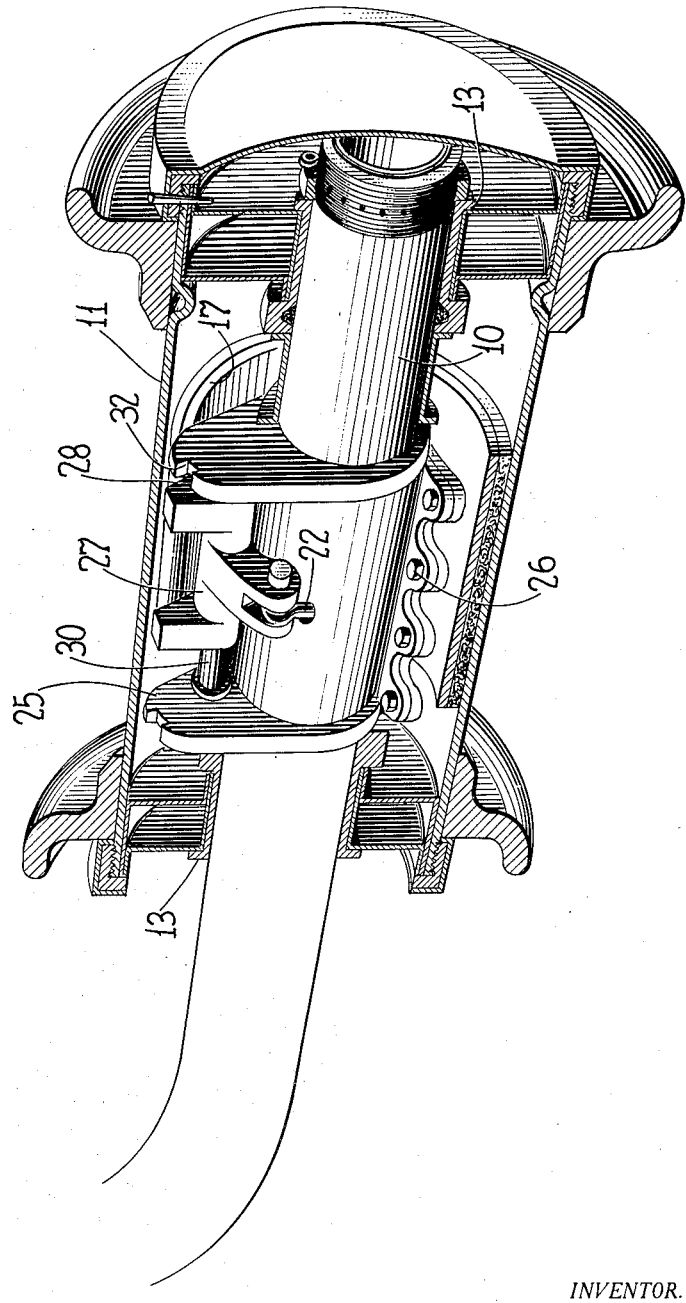
INVENTOR.
EARL J.W. RAGSDALE
BY
John P. Tarbox
ATTORNEY.

Patented July 2, 1935

2,006,479

UNITED STATES PATENT OFFICE 2,006,479

VEHICLE BRAKE

Earl J. W. Ragsdale, Norristown, Pa., assignor to Budd Wheel Company, Philadelphia, Pa., a corporation of Pennsylvania Application January 8, 1931, Serial No. 507,324
Renewed November 23, 1934

6 Claims. (Cl. 188—18)

My invention pertains to the art of brakes and is especially though not exclusively adapted to vehicle wheels in which the tire is mounted directly upon the hub, the hub thus constituting a combined hub and rim member. This type of wheel has recently become popular as an airplane wheel.

The braking of these wheels presents difficulties of a different and more intricate nature than that of wheels of the prior art, due to the small space afforded within the peripheral walls of the tire carrying member. It has been my object to provide a brake for a wheel of this character involving a compact and simple arrangement of the parts, providing a large braking surface, the brake being economical to manufacture and simple and effective in design and operation.

In order to attain these objects I have formed a braking surface directly upon the inner circumference of the hub and mounted the actuating mechanism within the hollow stationary axle about which the hub rotates. I have thus obtained a maximum amount of space between the hub and rim members available for the mounting of the brake shoe and the mechanism for operating it.

Further objects and advantages of my invention relate to an improved lost motion anchorage for my brake shoe and an improved and very simple system of levers for operating the shoe. Other objects will be obvious from a reading of the subjoined specification in the light of the attached drawings, in which Fig. 1 is a central axial section through my improved wheel and brake member.

Fig. 2 is a transverse section on the line 2—2 of Fig. 1.

Fig. 3 is a detailed view illustrating the inner connection between my axle and actuating shaft.

Fig. 4 is a central axial section through my hub and bearing members illustrating a portion of the braking mechanism in perspective.

Referring to the drawings by reference characters, the numeral 10 indicates a hollow vehicle axle about which a tire carrying member 11 in the nature of a combined rim and hub of small circumferential dimension is adapted to rotate. These members are inter-connected by means of suitable sheet metal supports 12 and anti-friction bearings 13, these supports being symmetrically disposed about the center line of the wheel.

The braking mechanism is designated generally at 14 and is spaced from the bearing 13 on the right hand end of the shaft by means of a suitable sheet metal supporting strip 15. The rotatable braking surface 16 is formed directly upon the inner circumference of the hub 11 in order to obtain a maximum amount of space between the hub and axle. The brake shoe 17 is in the nature of a split band adapted to be expanded into contact with the braking surface 16.

The actuating shaft 18 which effects the expansion of the shoe into contact with the rotatable braking surface is carried directly within the axle 10, and is held in proper alignment with the axle by means of a bearing member 19 secured within the axle and adapted to receive an extension 37 fixed to the actuating shaft. An actuating lever 20 effects the operation of the brake and is rigidly secured to the inner axial end of the actuating shaft by means of a suitable rigid connection 21. A cam operates against a link 22 which projects through an aligned opening 23 in the axle and a sleeve 24 which surrounds it. The split sleeve 24 constitutes a part of the anchor bracket 25 in which the brake actuating and anchor mechanism are mounted. Bolts 26 secure the split sleeve 24 to the outer periphery of the hollow axle and this sleeve is further keyed to the axle as indicated at 39 to prevent relative rotation between these members.

The link 22 is pivoted at a.. upper end to a bell crank 27 pivoted at 30 to the anchor bracket 25. The bell crank is provided with two arms extending upwardly from its fulcrum and these arms are each provided with suitable cam surfaces 28 adapted to abut against the reinforced ends 29 of the brake shoe to actuate the shoe.

The shoe is of continuously increasing cross section from its actuated end 29 toward its anchor end 31, the anchor end being provided with a suitable lug 31 which is received within an elongated slot 32 in the outer periphery of the bracket to anchor the shoe. The slot is somewhat longer than the lug and thus affords a lost motion connection between these parts for a purpose to be hereinafter explained.

The rear end of the lug 31 is held in contact with the rear edge of the slot 32 by means of a spring 35 secured to a U-shaped strip 34 which is fixed to the brake shoe and urges this shoe into contact with an abutment plate 33 which is secured fixedly to the axle by means of the bolts 26 which secure the split sleeve of the anchor bracket in place. A return spring 36 normally holds the brake in off position. Rotation of the shaft is effected by a suitable connection 38 adjacent its inner axial extremity, the shaft projecting out through a suitable opening in the curved inner portion of the axle adjacent this extremity.

The operation of the brake will now be apparent. Upon the actuation of the shaft 18 the lever 20 is rotated to effect a reciprocation of the link 22 together with the bell crank 21. This causes the cam faces 28 on the upper arm of the bell crank to force the shoe into contact with the rotating braking surface 16 on the inner circumference of the hub. The brake shoe will be first forced into contact with the drum adjacent its actuated end 29, as the tapering cross section of the brake shoe renders it more flexible in this region than in the neighborhood of its anchor. As a consequence of this actuation the shoe will tend to rotate with the drum, and as a certain degree of lost motion is afforded by reason of the relative dimensions of the lug 31 and slot 32, the drum and shoe will rotate together until the anchor end of the shoe abuts the left hand end of the slot 32 as viewed in Fig. 2. During this slight rotation the shoe is progressively flexed from its end of maximum thickness toward its anchor end and thus gradually brought into firm contact with a large portion of the drum before the actual braking operation takes place incident to the aforementioned abutment of the lug 31 against the left hand end of the slot. I am thus enabled to obtain the wrapping or self-energizing action which is considered so desirable in this type of brake.

Modifications will be obvious to those skilled in the art and I do not therefore wish to be limited except by the terms of my subjoined claims as interpreted in the light of the prior art and the generic spirit of my invention.

I claim:

1. A vehicle wheel comprising in combination, a rotatable rim member, a stationary hollow axle member, a braking surface rotatable with said rim member, a braking member fixed against rotation with said rim member, and a lever and link within said hollow axle for effecting a coaction between said braking member and said braking surface to retard rotation of the wheel.

2. A vehicle brake comprising in combination, a rotatable friction member, an anchored friction member, an anchor having an elongated slot and a lug upon said anchored friction member adapted to be received within said slot, said lug being of smaller circumferential extent than said slot, whereby to afford a lost motion connection between said anchored friction member and its anchor in the braking operation.

3. A vehicle wheel comprising in combination, a combined rotatable hub and rim member, a stationary hollow axle member, a braking surface rotatable with said hub and rim member, a braking member fixed against rotation with said hub and rim member, and a lever and link within said hollow axle for effecting a coaction between said braking member and said braking surface to retard rotation of the wheel.

4. A vehicle wheel comprising in combination, a rotatable rim member, a stationary hollow axle member, a braking surface rotatable with said rim member, a braking member fixed against rotation with said rim member, a link operatively connected with the braking member and projecting through an opening in the hollow axle member, and rotatable means within said hollow axle member for effecting a coaction between said braking member and said braking surface to retard rotation of the wheel.

5. A vehicle wheel comprising in combination, a rotatable rim member, a stationary hollow axle member, a braking surface rotatable with said rim member, a braking member fixed against rotation with said rim member, a bell crank operatively connected with said braking member through one of its arms to effect a braking operation thereof, a link pivoted to the opposite arm of said bell crank, said link projecting through an opening in the hollow axle, and means within said hollow axle for effecting an operation of the link to rotate the bell crank and apply the brake.

6. A vehicle wheel comprising in combination, a rotatable rim member, a stationary hollow axle member, a braking surface rotatable with said rim member, a braking member fixed against rotation with said rim member, a bell crank operatively connected with said braking member through one of its arms to effect a braking operation thereof, a link pivoted to the opposite arm of said bell crank, said link projecting through an opening in the hollow axle, and a lever within said hollow axle for effecting an operation of the link to rotate the bell crank and apply the brake.

EARL J. W. RAGSDALE.